US011381634B1

(12) United States Patent
Spring et al.

(10) Patent No.: US 11,381,634 B1
(45) Date of Patent: Jul. 5, 2022

(54) TFTP (TRIVIAL FILE TRANSFER PROTOCOL) BROADCAST CONTROLLER

(71) Applicant: International Business Machines Corporation, Armonk, NY (US)

(72) Inventors: Sierra Spring, Rochester, MN (US); Kent H. Haselhorst, Spring Valley, MN (US); Paul Schardt, Rochester, MN (US); George Russell Zettles, IV, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/392,472

(22) Filed: Aug. 3, 2021

(51) Int. Cl.
| | |
|---|---|
| *H04L 67/06* | (2022.01) |
| *G06F 9/4401* | (2018.01) |
| *G06F 8/61* | (2018.01) |
| *H04L 67/01* | (2022.01) |
| *H04L 101/622* | (2022.01) |

(52) U.S. Cl.
CPC ............... *H04L 67/06* (2013.01); *G06F 8/63* (2013.01); *G06F 9/4416* (2013.01); *H04L 67/01* (2022.05); *H04L 2101/622* (2022.05)

(58) Field of Classification Search
CPC ..... H04L 67/06; H04L 61/6022; H04L 67/42; G06F 8/63; G06F 9/4416
See application file for complete search history.

(56) References Cited

U.S. PATENT DOCUMENTS

| | | |
|---|---|---|
| 6,185,623 B1 | 2/2001 | Bailey |
| 7,934,007 B2 | 4/2011 | Wang |
| 8,769,137 B2 | 7/2014 | Simcoe |
| 10,218,774 B2 | 2/2019 | Gao |
| 10,594,772 B2 | 3/2020 | Gao |
| 2003/0177208 A1 | 9/2003 | Harvey, IV |
| 2005/0015810 A1 | 1/2005 | Gould |
| 2005/0177625 A1 | 8/2005 | Paek |
| 2007/0130354 A1 | 6/2007 | Nason |
| 2009/0327396 A1 | 12/2009 | Abdul |

(Continued)

FOREIGN PATENT DOCUMENTS

WO 2007009968 A1 1/2007

OTHER PUBLICATIONS

Loading Partial Bitstreams Using TFTP, Robinson, David, XILINX, XAPP1292 (v1.0), Oct. 5, 2016 (Year: 2016).*

(Continued)

*Primary Examiner* — Suraj M Joshi
(74) *Attorney, Agent, or Firm* — David B. Woycechowsky

(57) ABSTRACT

A method for providing a computer system including: a trivial file transfer protocol (TFTP) server computer, a system management controller computer and a set of subnet (s) including a first subnet, with each subnet of the set of subnet(s) including a primary computer and a plurality of host computers that respectively include a field programmable gate array (FPGA) with programmable blocks, polling, by the system management controller, each computer of the first subnet to determine that all of the computers of the first subnet are ready to receive a broadcast of an FPGA image, instructing the TFTP server computer to send the FPGA image to all of the machines of the first subnet; and sending, by the TFTP server computer and to all of the computers of the first subnet, the FPGA image.

18 Claims, 6 Drawing Sheets

(56) References Cited

U.S. PATENT DOCUMENTS

2016/0359950 A1  12/2016  Reddy
2017/0123815 A1*  5/2017  Sarmah ............... G06F 13/4068
2021/0124711 A1*  4/2021  Ansari ................ G06F 15/7882

OTHER PUBLICATIONS

Horvat et al., "STFTP : Secure TFTP Protocol For Embedded Multi-Agent Systems Communication", Advances in Electrical and Computer Engineering, vol. 13, No. 2, 2013, Digital Object Identifier 10.4316/AECE.2013.02004, pp. 23-32.
Isa et al., "A Lightweight And Secure TFTP Protocol For Smart Environment", 2012 International Symposium on Computer Applications and Industrial Electronics (ISCAIE 2012), Dec. 3-4, 2012, Kota Kinabalu Malaysia, pp. 302-306.
Mohamed et al., "Extending Hybrid Approach to Secure Trivial File Transfer Protocol in M2M Communication: A Comparative Analysis", Telecommunication Systems, © Springer Science+Business Media, LLC, part of Springer Nature 2018, Published online: Oct. 24, 2018, 14 pages, <https://doi.org/10.1007/s11235-018-0522-5>.
Mohamed et al., "New Packet Header Support and Key Exchange Mechanism for Secure Trivial File Transfer Protocol", International Journal of Electrical and Electronic Systems Research, vol. Dec. 11, 2017, 5 pages.
Robinson, David, "Loading Partial Bitstreams Using TFTP", XILINX, XAPP1292 (v1.0) Oct. 5, 2016, 19 pages.

* cited by examiner

TFTP (TRIVIAL FILE TRANSFER PROTOCOL) BROADCAST CONTROLLER

BACKGROUND

The present invention relates generally to the field of trivial file transfer protocol (TFTP) also to communications made by broadcast controllers.

The Wikipedia entry for "TFTP" (as of Apr. 29, 2021) states, in part, as follows: "Trivial File Transfer Protocol (TFTP) is a simple lockstep File Transfer Protocol which allows a client to get a file from or put a file onto a remote host. One of its primary uses is in the early stages of nodes booting from a local area network. TFTP has been used for this application because it is very simple to implement . . . . Due to its simple design, TFTP can be easily implemented by code with a small memory footprint. It is therefore the protocol of choice for the initial stages of any network booting strategy like BOOTP, PXE, BSDP, etc., when targeting from highly resourced computers to very low resourced Single-board computers (SBC) and System on a Chip (SoC). It is also used to transfer firmware images and configuration files to network appliances like routers, firewalls, IP phones, etc. Today, TFTP is virtually unused for Internet transfers. TFTP's design was influenced from the earlier protocol EFTP, which was part of the PUP protocol suite . . . . TFTP is a simple protocol for transferring files, implemented on top of the UDP/IP protocols using well-known port number 69. TFTP was designed to be small and easy to implement, and therefore it lacks most of the advanced features offered by more robust file transfer protocols. TFTP only reads and writes files from or to a remote server. It cannot list, delete, or rename files or directories and it has no provisions for user authentication. Today TFTP is generally only used on local area networks (LAN)." (footnote(s) omitted)

SUMMARY

According to an aspect of the present invention, there is a method, computer program product and/or system that performs the following operations (not necessarily in the following order): (i) providing computer system including: a trivial file transfer protocol (TFTP) server computer, a system management controller computer and a set of subnet(s) including a first subnet, with each subnet of the set of subnet(s) including a primary computer and a plurality of host computers that respectively include a field programmable gate array (FPGA) with programmable blocks; (ii) polling, by the system management controller, each computer of the first subnet to determine that all of the computers of the first subnet are ready to receive a broadcast of an FPGA image; (iii) responsive to the determination that all of the computers of the first subnet are ready to receive the broadcast of the FPGA image, instructing the TFTP server computer to send the FPGA image to all of the machines of the first subnet; and (iv) sending, by the TFTP server computer and to all of the computers of the first subnet, the FPGA image.

DETAILED DESCRIPTION

Figure 1:
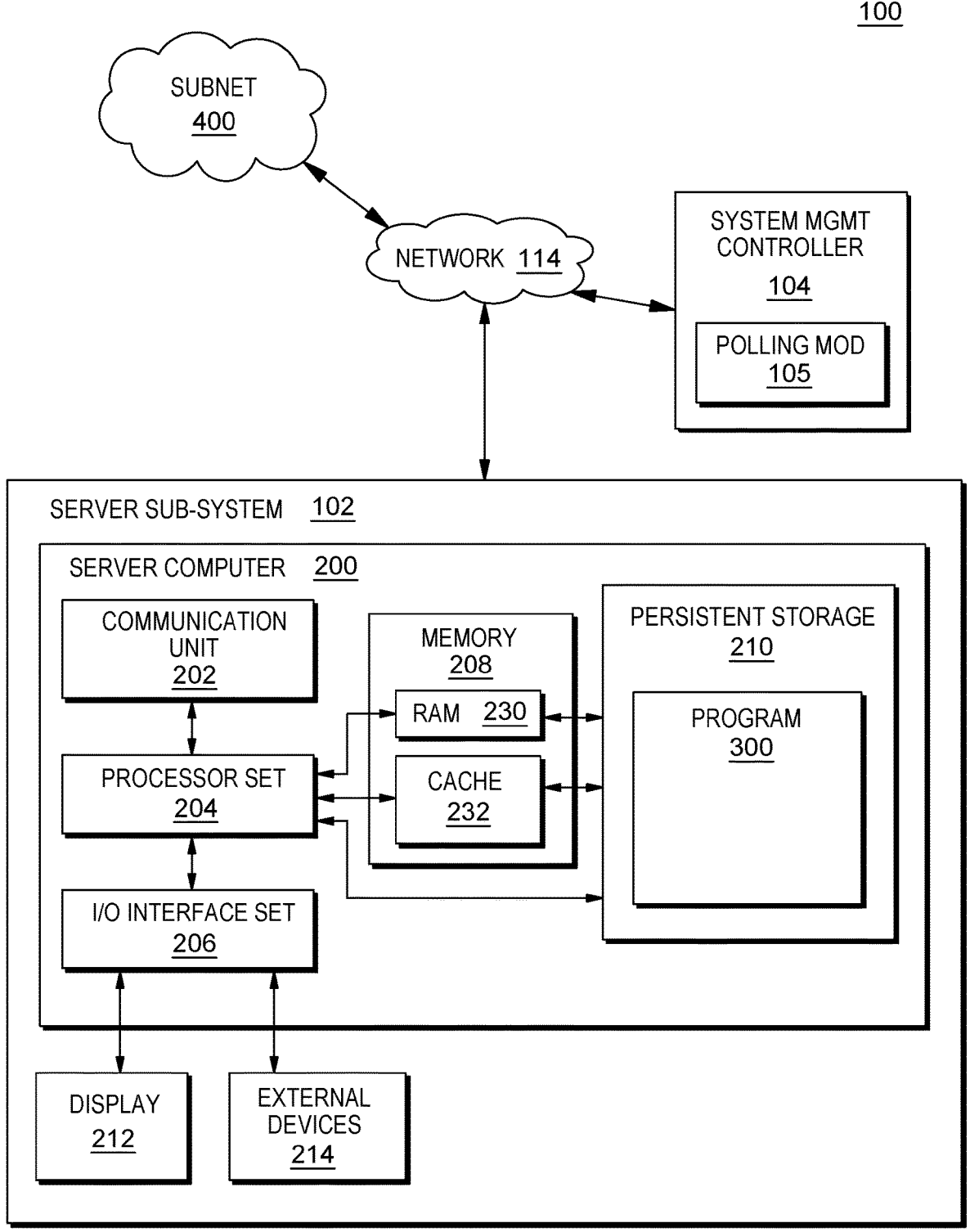
FIG. 1 is a block diagram of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); system management controller 104, polling mod 105; communication network 114; server computer 200; communication unit 202; processor set 204; input/output (I/O) interface set 206; memory 208; persistent storage 210; display 212; external device(s) 214; random access memory (RAM) 230; cache 232; program 300; and subnet 400.

Program 300 is a collection of machine readable instructions and/or data that is used to create, manage and control certain software functions that will be discussed in detail, below, in the Example Embodiment subsection of this Detailed Description section.

Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
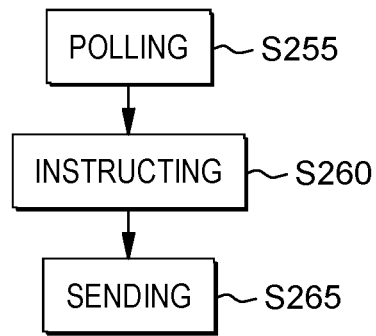
FIG. 2 is a flowchart showing a first embodiment method performed, at least in part, by the first embodiment system.
Figure 3:
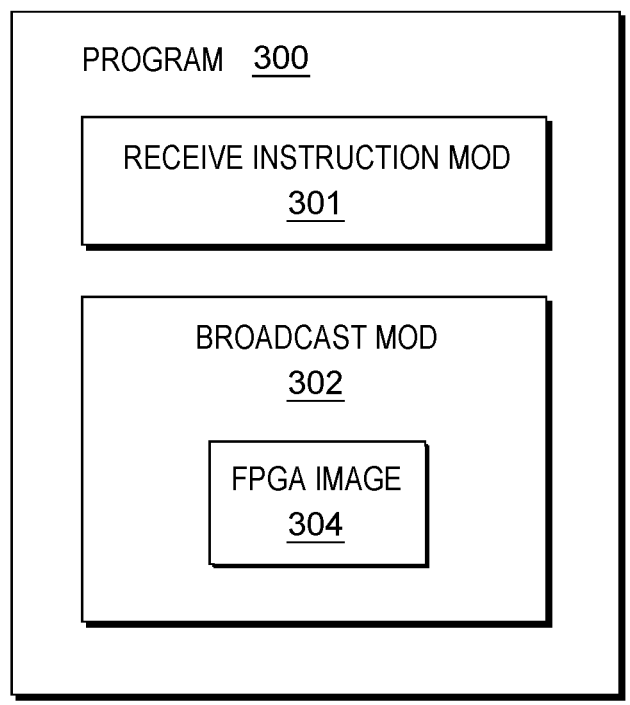
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4:
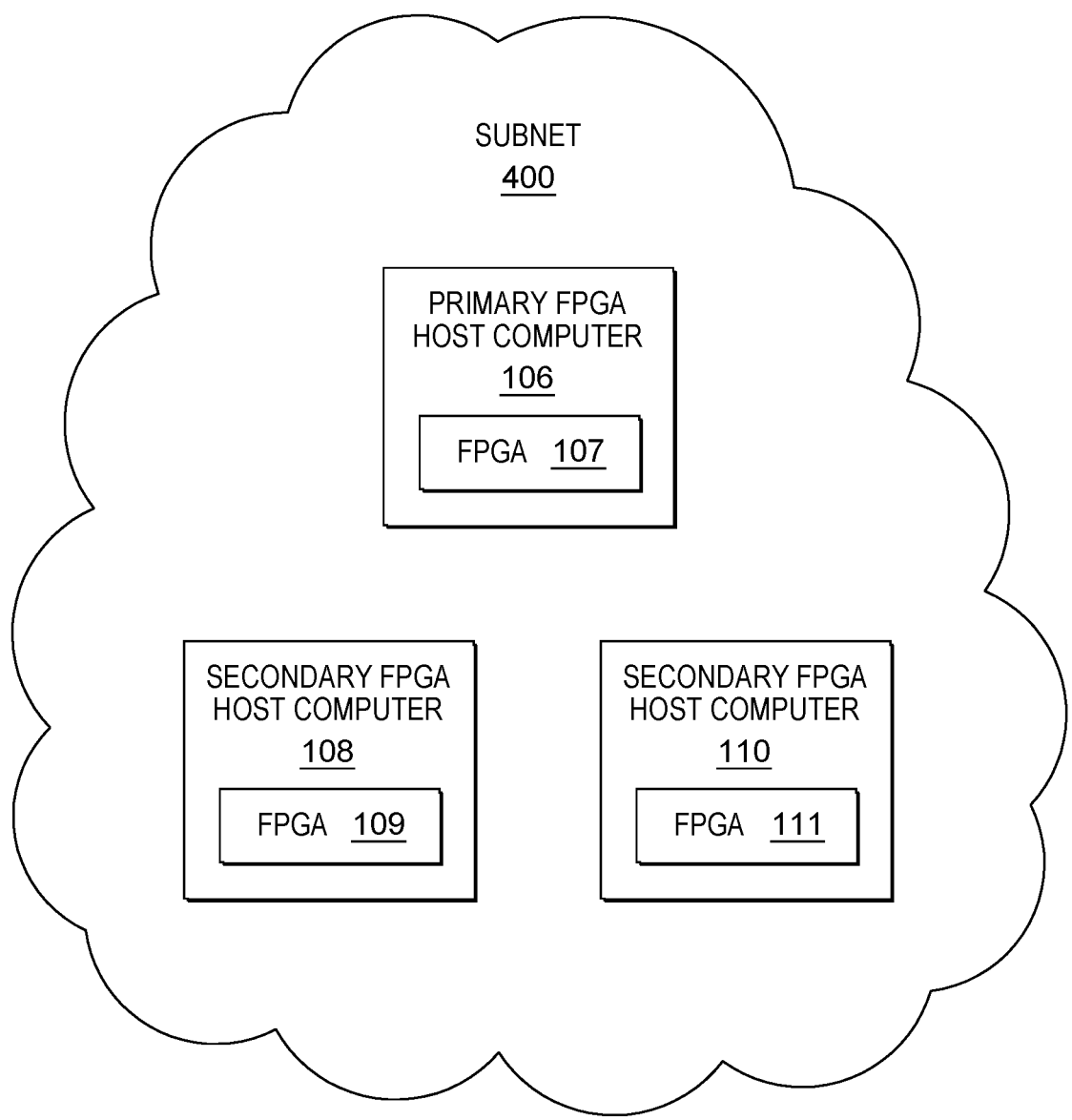
FIG. 4 is a screenshot view generated by the first embodiment system.

Prior to the start of the method of flowchart 250, a computer system is provided as shown in FIG. 1, including system management controller computer 104, and subnet 400. As shown in FIG. 4, subnet 400 includes: primary FPGA host computer 106 (including FPGA 107), secondary FPGA host computer 108 (including FPGA 109), and secondary FPGA host computer 110 (including FPGA 111).

Processing proceeds to operation S255, where polling module ("mod") 105 of system management controller 104 polls each computer 106, 108, 110 of subnet 400 to determine that all of the computers of subnet 400 are ready to receive a broadcast of FPGA image 304.

Processing proceeds to operation S260, where system management controller 104 instructs receive instruction mod 301 of program 300 of TFTP server subsystem 102 to send FPGA image 304 to all of the machines 106, 108, 110 of subnet 400.

Processing proceeds to operation S265, where broadcast mod 302 sends FPGA image 304 to each computer 106, 108, 110 of subnet 400. These images are used to program the programmable blocks of FPGAs 107, 109, 111 of subnet 400 (see FIG. 4).

III. Further Comments and/or Embodiments

Systems that have devices with FPGAs (field programmable gates) have been growing in use due to their ability of having programmable logic blocks. FPGA needs to be imaged to use it programmable logic blocks. One method of doing this is using TFTP. The FPGA has an initial boot image. It is typically stored on NOR flash or a data storage card and then sends a request to the TFTP server to transmit the FPGA its secondary boot image. TFTP Servers supports either a push or pull methodology for transmitting images. A push methodology is also be known as a TFTP broadcast. The typical TFTP broadcast includes two types of devices, a main computer/client computer (also sometimes referred to as primary computer/secondary computer) where typically there is one main computer and many client computers per subnet. Typically, the main computer controls the push (that is, the TFTP broadcast) without querying if the clients are ready. The main computer monitors for timeouts in the various multiple client machines receiving FPGA secondary pushed images. A timeout experienced by a client computer means that the client computer was not ready to receive the image. Client computers can be reprogrammed to act as main computers if needed. This process repeats. However, this approach uses a lot of system resource and is slow.

Some embodiments of the present invention may include one, or more, of the following operations, features, characteristics and/or advantages: (i) system initialization for a computer system for exchanging messages between computers in a runtime environment; and/or (ii) generic to a system using a TFTP server to push processor images (for example, FPGA secondary images) to the various physical host machines of the computing environment.

Some embodiments of the present invention may include one, or more, of the following operations, features, characteristics and/or advantages: (i) controls the TFTP broadcast to multiple FPGA host machines in a system; (ii) minimizes traffic on the TFTP private network; (iii) the TFTP broadcast controller includes one type of device on a subnet; (iv) the system management controller verifies that all devices in a system are ready for the broadcast and then sends a single request to the TFTP server to initiate the broadcast; (v) reduces timeout errors and associated overhead; (vi) the system controller has its own direct communication path with the FPGA host devices; (vii) the direct communication path between the system controller and host devices is not via ethernet, thus, minimizing ethernet traffic; (viii) once an FPGA secondary image is received by an FPGA host machine, the system management controller will confirm that the firmware ran successfully; (ix) if any FPGA physical host device did not successfully initialize, then the system management controller will power cycle those device(s) and repeat the initialization boot process; and/or (x) if a FPGA physical host device on the subnet is not looking to receive a pushed FPGA secondary image, then the full image of the FPGA hosted by that FPGA physical host device will be unaffected.

Figure 5:
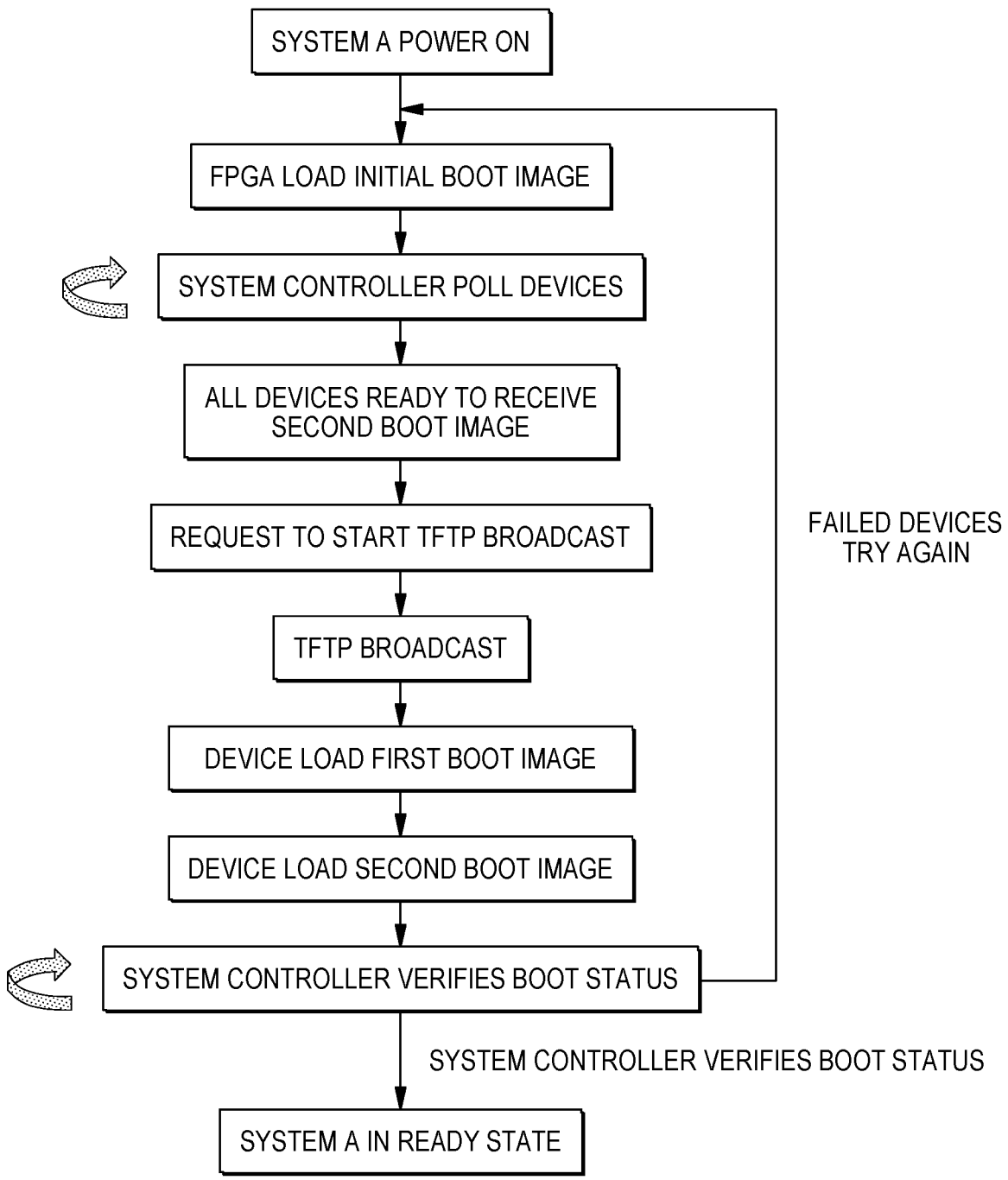
FIG. 5 is a flowchart showing a second embodiment of method according to the present invention.

As shown in FIG. 5, flowchart 500 is an embodiment of a method for system initialization for a computer system called System A.

In one embodiment, a TFTP broadcast controller is made up of the following components: (i) TFTP server; (ii) TFTP Private network (with a direct communication path, wireless or wired) between the TFTP server and all of the FPGA host computers of the system); (iii) a system; and (iv) a system management controller.

The TFTP server handles storage of secondary boot images and transmits those images. The TFTP server can support transmitting multiple types of FPGA images as well as multiple release versions. The server can also be a DNS (domain name system) server that would be responsible for IP assignment of devices that are in a system. The DNS server can handle multiple subnets and the subnet of assigned IP can be set for either per FPGA image type or per system.

Figure 6:
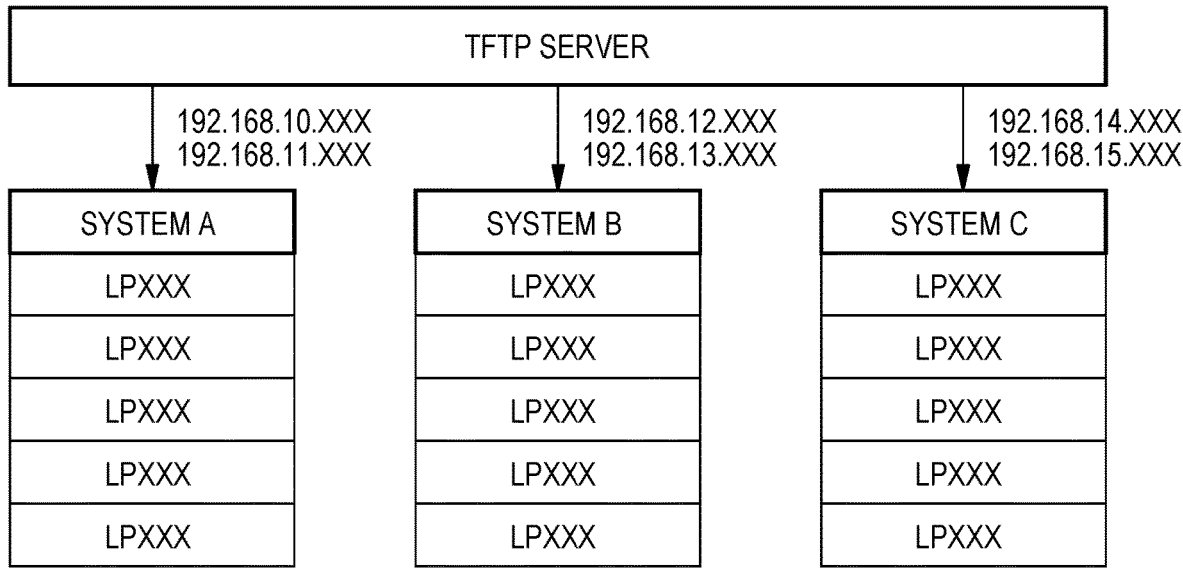
FIG. 6 is a block diagram of a second embodiment of a system according to the present invention.
Figure 7:
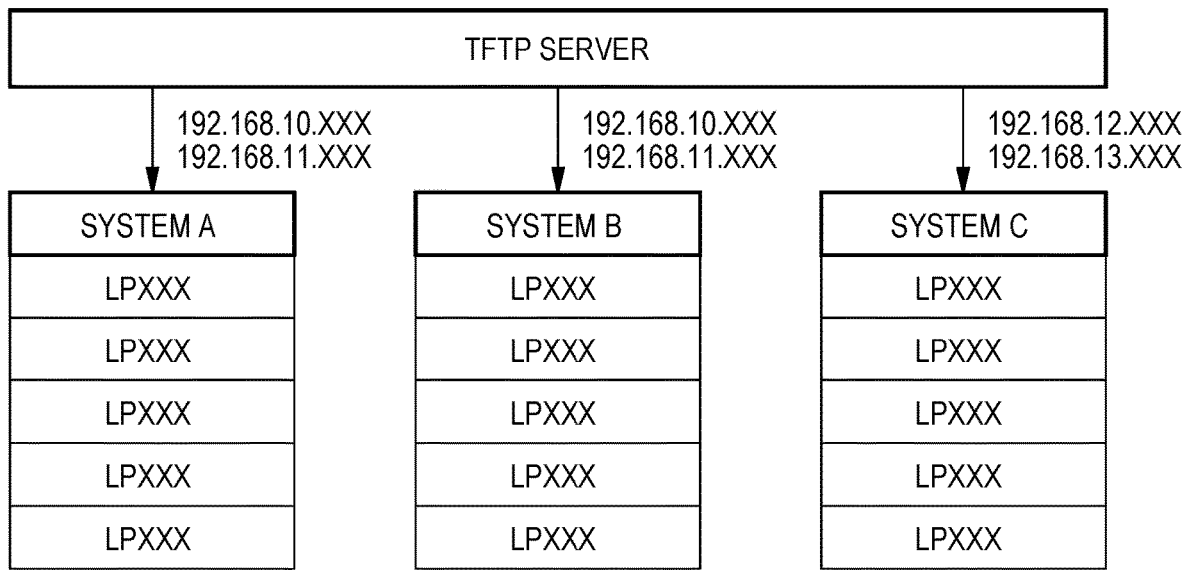
FIG. 7 is another block diagram of a second embodiment of a system according to the present invention.

Block diagram 600 of FIG. 6 and block diagram 700 of FIG. 7 are both examples of different systems configuration subnet setups. Subnet could be unique to a system or share between multiple systems. The server is the gateway for the private ethernet network.

Figure 8:
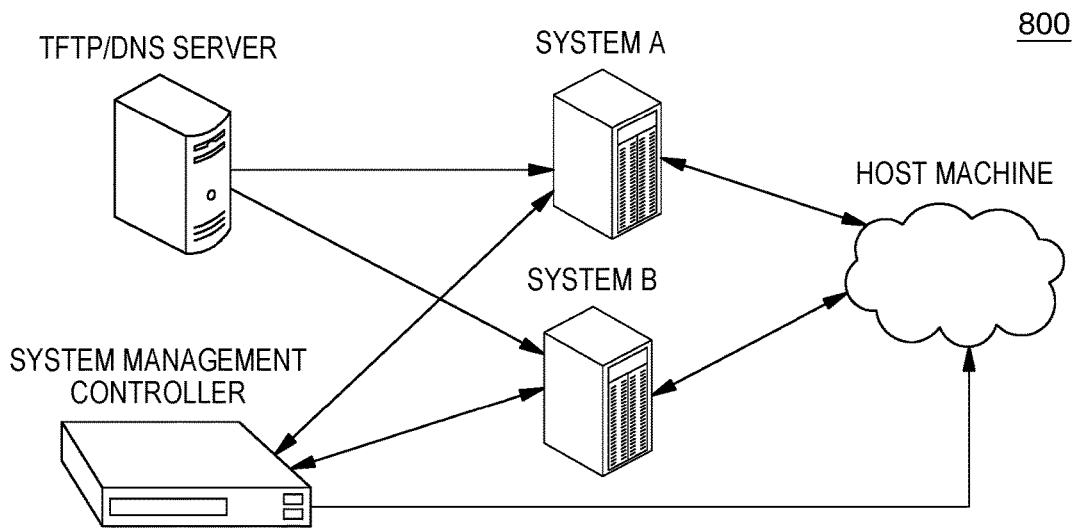
FIG. 8 is another block diagram of a second embodiment of a system according to the present invention.

As shown in block diagram 800 of FIG. 8, the TFTP private network is an ethernet network between TFTP server, system(s), system management controller and host machine. Some example communications that may be used in a TFTP broadcast controller are shown. The lines and arrows of FIG. 8 show traffic on the private network. FIG. 8 shows the direct communication interface between system management controller and each system. The TFTP Server is always listening for a broadcast request and once it receives one, will transmit a secondary image to all or to a subgroup of devices on that subnet. If devices are not in a state of waiting to receive their secondary image, they will ignore the broadcast. The system management controller sends TFTP broadcast requests as well as stop commands to the TFTP to end the broadcast. The system management controller can be requested by the host machine to give system status. The host machine is also responsible for sending and receiving instructions with system's devices when in a running state.

The system can have many custom configurations including system size, device hierarchy (parent/child relationship), device type, image version, etc. Each system on a network could have its own custom configuration but all systems must have at least one device type that has a FPGA. Examples of potential system configurations are shown below. Both System A and System B have parent-child device hierarchies that depend upon different device configurations.

The system management controller has at least two communication interfaces
  Ethernet access to private network
  Direct communication path to each system and its devices
The system management controller is responsible for the following:
  System power sequencing
  Get system status
  Determine if system is ready for broadcast
  Requesting TFTP broadcast
  Determine device initialization status The system management controller has a few methods it could use to determine status of a system like reading of status registers. Also, it can have a more complex solution of having some type of AI (artificial intelligence) or machine learning, with training on different fail scenarios, and what solution action(s) to take.

Figure 9:
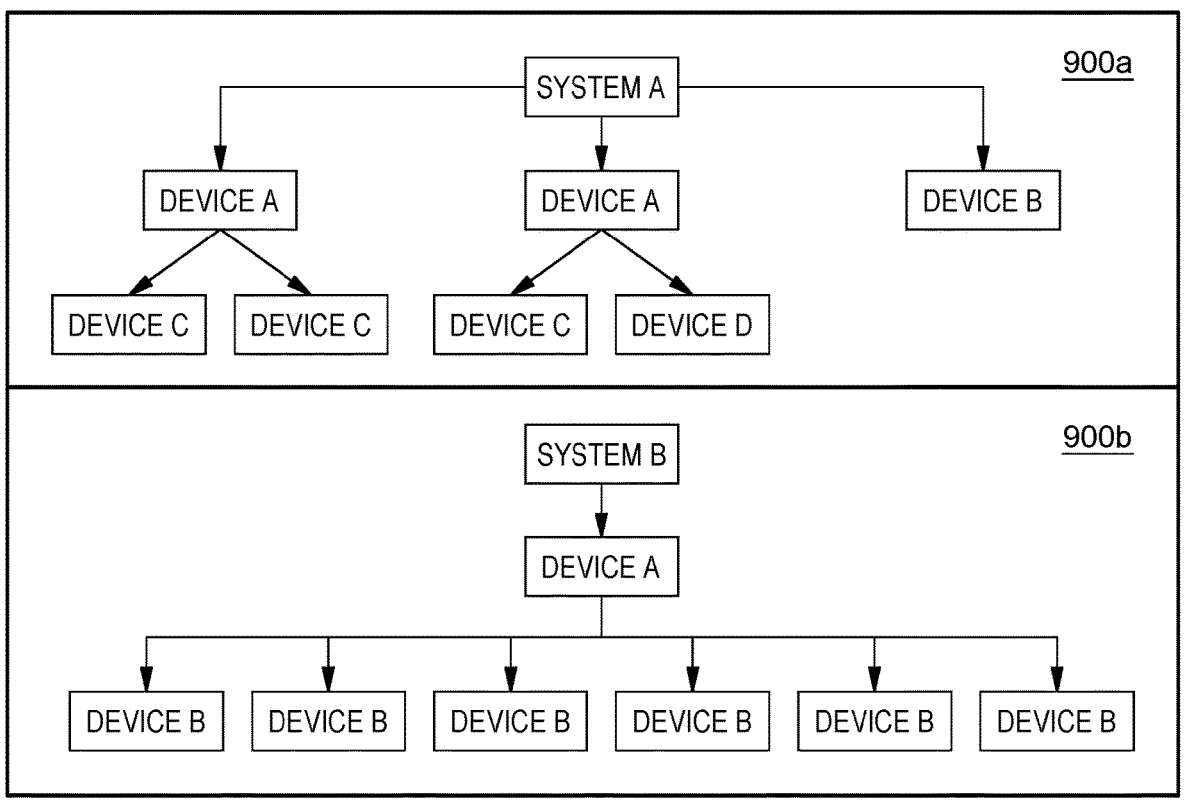
FIG. 9 is another block diagram of a second embodiment of a system according to the present invention.

As shown in FIG. 9, block diagram 900 illustrates an embodiment with a TFTP Server for multiple systems 900*a* and 900*b*.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi)

mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Cloud computing system: a computer system that is distributed over the geographical range of a communication network(s), where the computing work and/or computing resources on the server side are primarily (or entirely) implemented by VCEs (see definition of VCEs in previous paragraph). Cloud computing systems typically include a cloud orchestration module, layer and/or program that manages and controls the VCEs on the server side with respect to instantiations, configurations, movements between physical host devices, terminations of previously active VCEs and the like.

What is claimed is:

1. A computer implemented method (CIM) comprising:
providing a computer system including: a trivial file transfer protocol (TFTP) server computer, a system management controller computer and a set of subnet(s) including a first subnet, with each subnet of the set of subnet(s) including a primary computer and a plurality of host computers that respectively include a field programmable gate array (FPGA) with programmable blocks;
polling, by the system management controller, each computer of the first subnet to determine that all of the computers of the first subnet are ready to receive a broadcast of an FPGA image;
responsive to the determination that all of the computers of the first subnet are ready to receive the broadcast of the FPGA image, instructing the TFTP server computer to send the FPGA image to all of the machines of the first subnet; and
sending, by the TFTP server computer and to all of the computers of the first subnet, the FPGA image;
wherein the system management controller computer uses an exclusive and direct communication path with the respective FPGAs of the plurality host computers of the set of subnet(s); and
wherein the polling operation uses the exclusive and direct communication paths.

2. The CIM of claim 1 further comprising:
for each given FPGA included in the first subnet, programming the given FGPA using the first FPGA image.

3. The CIM of claim 1 further comprising:
confirming the power status of the computer system.

4. The CIM of claim 1 further comprising:
performing power sequencing of the computer system.

5. The CIM of claim 1 wherein the TFTP server computer also operates as a DNS (domain name system) server that controls IP (internet protocol) assignment of devices included in the computer system.

6. The CIM of claim 1 further comprising:
assigning, by the TFTP server, a set of internet protocol address(es) to each primary computer of each subnet of the set of subnet(s) based on MAC (media access control) addresses.

7. A computer program product (CPP) comprising:
a set of non-transitory storage device(s); and
computer code stored collectively in the set of storage device(s), with the computer code including data and instructions to cause a processor(s) set to perform at least the following operations:
providing a computer system including: a trivial file transfer protocol (TFTP) server computer, a system management controller computer and a set of subnet (s) including a first subnet, with each subnet of the set of subnet(s) including a primary computer and a plurality of host computers that respectively include a field programmable gate array (FPGA) with programmable blocks,
polling, by the system management controller, each computer of the first subnet to determine that all of the computers of the first subnet are ready to receive a broadcast of an FPGA image,
responsive to the determination that all of the computers of the first subnet are ready to receive the broadcast of the FPGA image, instructing the TFTP server computer to send the FPGA image to all of the machines of the first subnet, and
sending, by the TFTP server computer and to all of the computers of the first subnet, the FPGA image;
wherein the system management controller computer uses an exclusive and direct communication path with the respective FPGAs of the plurality host computers of the set of subnet(s); and
wherein the polling operation uses the exclusive and direct communication paths.

8. The CPP of claim 7 wherein the computer code further includes instructions for causing the processor(s) set to perform the following operation(s):
for each given FPGA included in the first subnet, programming the given FGPA using the first FPGA image.

9. The CPP of claim 7 wherein the computer code further includes instructions for causing the processor(s) set to perform the following operation(s):
confirming the power status of the computer system.

10. The CPP of claim 7 wherein the computer code further includes instructions for causing the processor(s) set to perform the following operation(s):
performing power sequencing of the computer system.

11. The CPP of claim 7 wherein the TFTP server computer also operates as a DNS (domain name system) server that controls IP (internet protocol) assignment of devices included in the computer system.

12. The CPP of claim 7 wherein the computer code further includes instructions for causing the processor(s) set to perform the following operation(s):

assigning, by the TFTP server, a set of internet protocol address(es) to each primary computer of each subnet of the set of subnet(s) based on MAC (media access control) addresses.

13. A computer system (CS) comprising:

a processor(s) set;

a set of storage device(s); and computer code stored collectively in the set of storage device(s), with the computer code including data and instructions to cause the processor(s) set to perform at least the following operations:

provding a computer system including: a trivial file transfer protocol (TFTP) server computer, a system management controller computer and a set of subnet(s) including a first subnet, with each subnet of the set of subnet(s) including a primary computer and a plurality of host computers that respectively include a field programmable gate array (FPGA) with programmable blocks, polling, by the system management controller, each computer of the first subnet to determine that all of the computers of the first subnet are ready to receive a broadcast of an FPGA image, responsive to the determination that all of the computers of the first subnet are ready to receive the broadcast of the FPGA image, instructing the TFTP server computer to send the FPGA image to all of the machines of the first subnet, and sending, by the TFTP server computer and to all of the computers of the first subnet, the FPGA image;

wherein the system management controller computer uses an exclusive and direct communication path with the respective FPGAs of the plurality host computers of the set of subnet(s); and wherein the polling operation uses the exclusive and direct communication paths.

14. The CS of claim 13 wherein the computer code further includes instructions for causing the processor(s) set to perform the following operation(s):

for each given FPGA included in the first subnet, programming the given FGPA using the first FPGA image.

15. The CS of claim 13 wherein the computer code further includes instructions for causing the processor(s) set to perform the following operation(s):

confirming the power status of the computer system.

16. The CS of claim 13 wherein the computer code further includes instructions for causing the processor(s) set to perform the following operation(s):

performing power sequencing of the computer system.

17. The CS of claim 13 wherein the TFTP server computer also operates as a DNS (domain name system) server that controls IP (internet protocol) assignment of devices included in the computer system.

18. The CS of claim 13 wherein the computer code further includes instructions for causing the processor(s) set to perform the following operation(s):

assigning, by the TFTP server, a set of internet protocol address(es) to each primary computer of each subnet of the set of subnet(s) based on MAC (media access control) addresses.

* * * * *